(12) United States Patent
Schlansker et al.

(10) Patent No.: US 9,166,911 B2
(45) Date of Patent: Oct. 20, 2015

(54) TEACHING A NETWORK DEVICE USING UNSOLICITED TEACHING MESSAGES

(75) Inventors: Mike Schlansker, Los Altos, CA (US); Jean Tourrilhes, Mountain View, CA (US); Yoshio Turner, San Francisco, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 710 days.

(21) Appl. No.: 13/386,573

(22) PCT Filed: Jan. 28, 2010

(86) PCT No.: PCT/US2010/022376
§ 371 (c)(1),
(2), (4) Date: Jan. 23, 2012

(87) PCT Pub. No.: WO2011/093860
PCT Pub. Date: Aug. 4, 2011

(65) Prior Publication Data
US 2012/0124167 A1    May 17, 2012

(51) Int. Cl.
*G06F 15/16* (2006.01)
*H04L 12/753* (2013.01)
*H04L 12/413* (2006.01)

(52) U.S. Cl.
CPC ............ *H04L 45/48* (2013.01); *H04L 12/413* (2013.01)

(58) Field of Classification Search
CPC ............................. H04L 45/48; H04L 12/413
USPC .......................................................... 709/217
See application file for complete search history.

(56) References Cited

U.S. PATENT DOCUMENTS

| 6,167,450 | A   | * | 12/2000 | Angwin et al. | 709/227 |
|-----------|-----|---|---------|---------------|---------|
| 6,668,284 | B1  | * | 12/2003 | Parkhurst     | 719/313 |
| 7,577,143 | B1  |   | 8/2009  | Kompella      |         |
| 8,359,379 | B1  | * | 1/2013  | Sen           | 709/223 |
| 2003/0191843 | A1 | * | 10/2003 | Balissat et al. | 709/227 |
| 2004/0064584 | A1 | * | 4/2004  | Mitchell et al. | 709/245 |
| 2007/0118649 | A1 | * | 5/2007  | Sills et al.  | 709/225 |
| 2008/0186965 | A1 |   | 8/2008  | Zheng et al.  |         |

OTHER PUBLICATIONS

Geoff Haviland, "Designing High-Performance Campus Intranets with Multilayer Switching," White Paper, Cisco Systems, 1998, pp. 1-33.
M. Huynh et al., "Metropolitan Ethernet Network: A Move from LAN to MAN," Computer Networks, vol. 51, Issue 17, Dec. 5, 2007, pp. 4867-4894.

(Continued)

*Primary Examiner* — Phuoc Nguyen
(74) *Attorney, Agent, or Firm* — Hewlett-Packard Patent Department

(57) ABSTRACT

Illustrated is a system and method to generate a teaching message with a host device address that impersonates a device source address, the impersonation to instruct an additional network device as to the host device address. It further include a transmitter to transmit the teaching message to the additional network device. It also includes traversing a forwarding table to identify an additional network device that has yet to receive a teaching message since an expiration of a predefined threshold value, the teaching message to relate to a source device. It also includes a transmitter to transmit a teaching message to the additional network device.

22 Claims, 14 Drawing Sheets

(56) References Cited

OTHER PUBLICATIONS

Notification of Transmittal of the International Search Report and the Written Opinion of the International Searching Authority, or the Declaration, Hewlett-Packard Development Company, L.P., et al., International Application No. PCT/US2010/022376 filed Jan. 28, 2010, Date of Mailing: Oct. 27, 2010, pp. 1-8.

S. Sharma et al., "Viking: A Multi-spanning-tree Ethernet Architecture for Metropolitan Area and Cluster Networks," IEEE INFOCOM, Mar. 7, 2004, pp. 1-12, 2004 IEEE.

* cited by examiner

TEACHING A NETWORK DEVICE USING UNSOLICITED TEACHING MESSAGES

CROSS-REFERENCE TO RELATED APPLICATION

This application is a national stage application under 35 U.S.C. §371 of PCT/US2010/022376, filed Jan. 28, 2010.

BACKGROUND

Ethernet is a family of frame-based computer networking technologies implemented at the link layer of the Internet Protocol (IP) suite model. The Ethernet frames implemented in this model include fields describing the Media Access Control (MAC) addresses of devices utilizing the network within which the protocol is implemented. Example fields include a destination MAC address field, a source MAC address field, an Ether Type field, a load field, and other fields. These fields are outlined, for example, in the Institute of Electrical and Electronics Engineers (IEEE) 802.3 standard.

Networks using Ethernet typically broadcast (e.g., flood) messages across a spanning tree operatively connecting the devices that are part of this network. These devices include switches (e.g., layer 1-2 devices), routers (e.g., layer 1-3 devices), and host devices. Operatively connected, as used herein, is a logical or physical connection. A connection between any two adjacent devices is a link.

Networks using Ethernet may also unicast messages along links that operatively connect devices in the network. For example, when a device "X" receives a message from a device "Y" on a link, an entry in a forwarding table is created so that all subsequent messages received by device "X" destined for device "Y" are sent along the same link. Using this method, device "X" can be taught a link in a path that ultimately leads to device "Y." This form of teaching is symmetric (referenced herein as symmetric teaching) in nature for the path from device "Y" to device "X" is effectively retraced to deliver a message from device "X" to the device "Y."

BRIEF DESCRIPTION OF THE DRAWINGS

Some embodiments of the invention are described, by way of example, with respect to the following figures.

DETAILED DESCRIPTION

Figure 1:
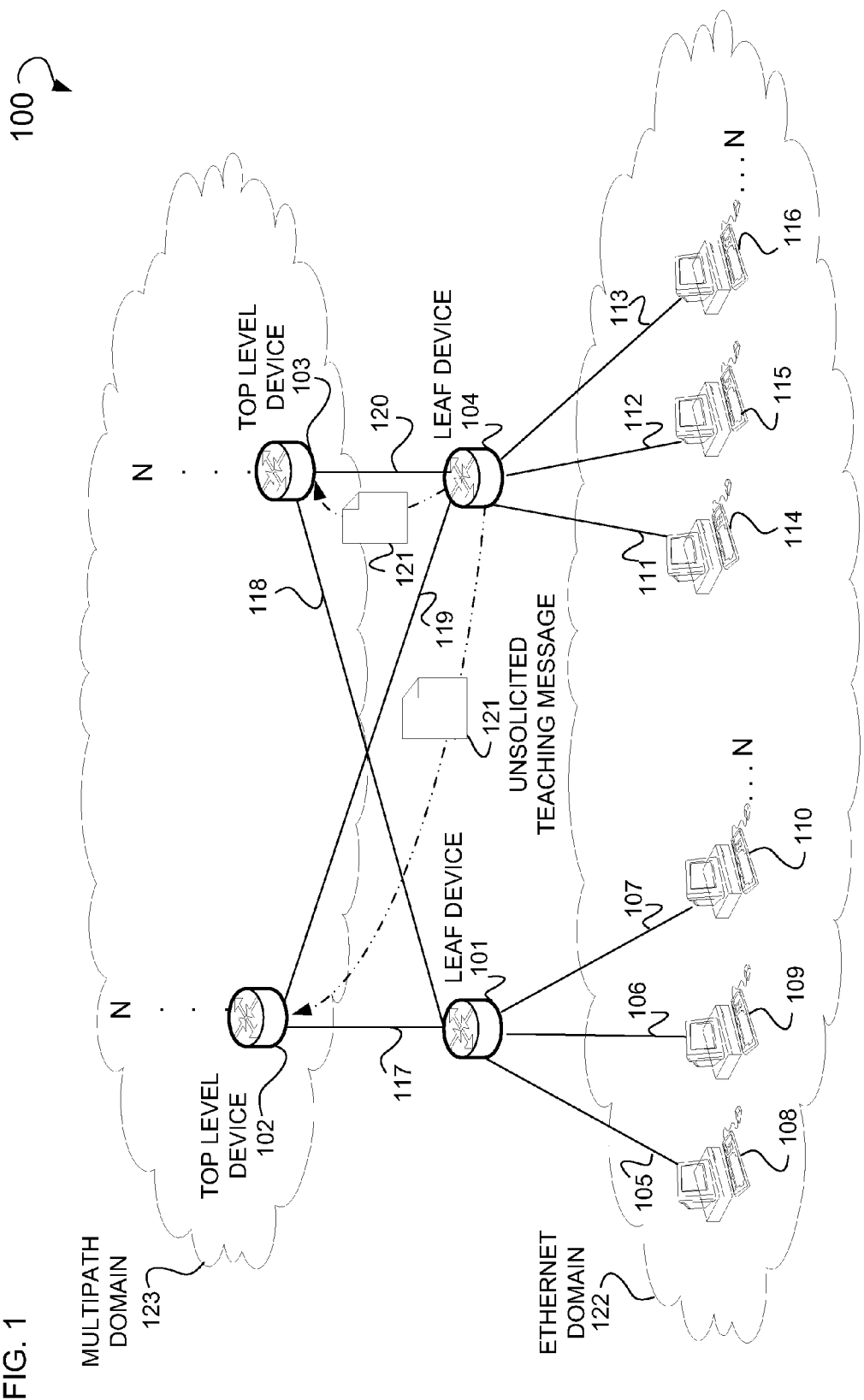
FIG. 1 is a diagram of a system, according to an example embodiment, used to implement a time period based mechanism implemented to broadcast information about learned destinations (e.g., host devices) that are assigned to downlinks for a given leaf device.

Illustrated is a system and method for the asymmetric teaching of network devices operatively connected via a network. Asymmetric teaching, as used herein, is the teaching of a network device using incongruent communications between devices. Specifically, rather than using the query-reply based communication of symmetric teaching, asymmetric teaching instructs network devices as to the location of a host device without the expectation of a reply.

In one example embodiment, asymmetric teaching is implemented through an impersonation regime. This impersonation regime includes the generation of a "teaching message" through the insertion of an address of a learned destination (e.g., a host device address included in a forwarding table) into a source field of a data packet. A data packet may include a data packet formatted as an Ethernet frame, an Internet Control Message Protocol (ICMP) formatted data packet, or some other suitably formatted data packet. This address may be inserted in lieu of the address of the address of the sending device. For the purposes of illustration only, in one example embodiment, a MAC address of a learned destination (e.g., a host device) may be inserted into the source field of an Ethernet frame. This insertion is performed by a leaf device that is connected to the host device via a down link. As used herein, a leaf device may be access layer switch, customer edge, or some other suitable device. The teaching message is then broadcast or unicast to a top level device, creating the appearance that the Ethernet frame is received from host device, rather than the leaf device. The leaf device, in effect, impersonates the host device. A top level switch, as used herein, is a distribution layer switch, a core layer switch, a provider edge, or some other suitable device. The result of this impersonation is that the top level device that receives the teaching message is taught the location of the host device. In cases where the teaching message is forwarded by the top level device to another network device, the teaching of the location of the host device is propagated through a network.

In one example embodiment, a time period based mechanism is implemented to broadcast information about learned destinations (e.g., host devices) that are assigned to downlinks for a given leaf device. At the end of each time period "T," for each entry in the forwarding table that associates some destination "D" (i.e., a host device) to a downlink port, a distinct broadcast message is sent on each uplink of the leaf switch. The broadcast message (i.e., a "teaching message") includes the source address (e.g., the MAC source address included in the Ethernet frame) for destination "D," and an operation type that is ignored by recipients. An example of a broadcast message is an unsolicited Ethernet ping. Unsolicited, as used herein, includes a message that is not provided in response or reply to another message. Through using an unsolicited Ethernet ping, top level switches can be taught the location of device "D" on an asymmetric teaching basis. Where these top level switches are taught using a teaching message, the top level switches learn what forwarding information to eliminate from flooding to subsequent destinations. Where the location of "D" is already known, the teaching message need not be forwarded.

FIG. 1 is a diagram of an example system 100 used to implement a time period based mechanism used to broadcast information about learned destinations (e.g., host devices) that are assigned to downlinks for a given leaf device. Illustrated is a leaf device 101 that is operatively connected to host devices 108-110. Host device 108 is connected to the leaf device 101 via the downlink 105. Host device 109 is connected to the leaf device 101 via the downlink 106. Host device 110 is connected to the leaf device 101 via the downlink 107. Also shown are host devices 114-116 that are operatively connected to the leaf device 104 via a plurality of downlinks. The host devices 108-110 and 114-116 are part of an ethernet domain 112. Leaf device 104 is connected to host device 114 via the downlink 111. Leaf device 112 is connected to host device 115 via downlink 112. Leaf device 104 is connected to host device 116 via link 113. Each of the leaf devices 101 and 104 are operatively connected to the top level devices 102 and 103 that are part of a multipath domain 123. As used herein, a multipath domain is domain with a plurality of paths between devices in the domain. An example of a multipath domain is a Virtual Local Area Network (VLAN). Specifically, the leaf device 101 is connected to the top level device 102 via the link 117, and is connected to the top level device 103 via the link 118. Further, the leaf device 104 is connected to the top level device 103 via the link 120, and to the top level device 102 via the link 119.

In some example embodiments, an unsolicited teaching message 121 is broadcast by the leaf device 104 to top level device to which it is operatively connected. Here, for example, the leaf device 104 broadcast these unsolicited messages 121 to the top level devices 102 and 103 via the links 119 and 120. Examples of the unsolicited teaching messages 121 include an Ethernet frame with a source MAC address field that used to teach a top level device the address of a host device, ICMP message that includes the source MAC address that is to be used to teach a top level device the address of a host device, or some other suitable message.

Figure 2:
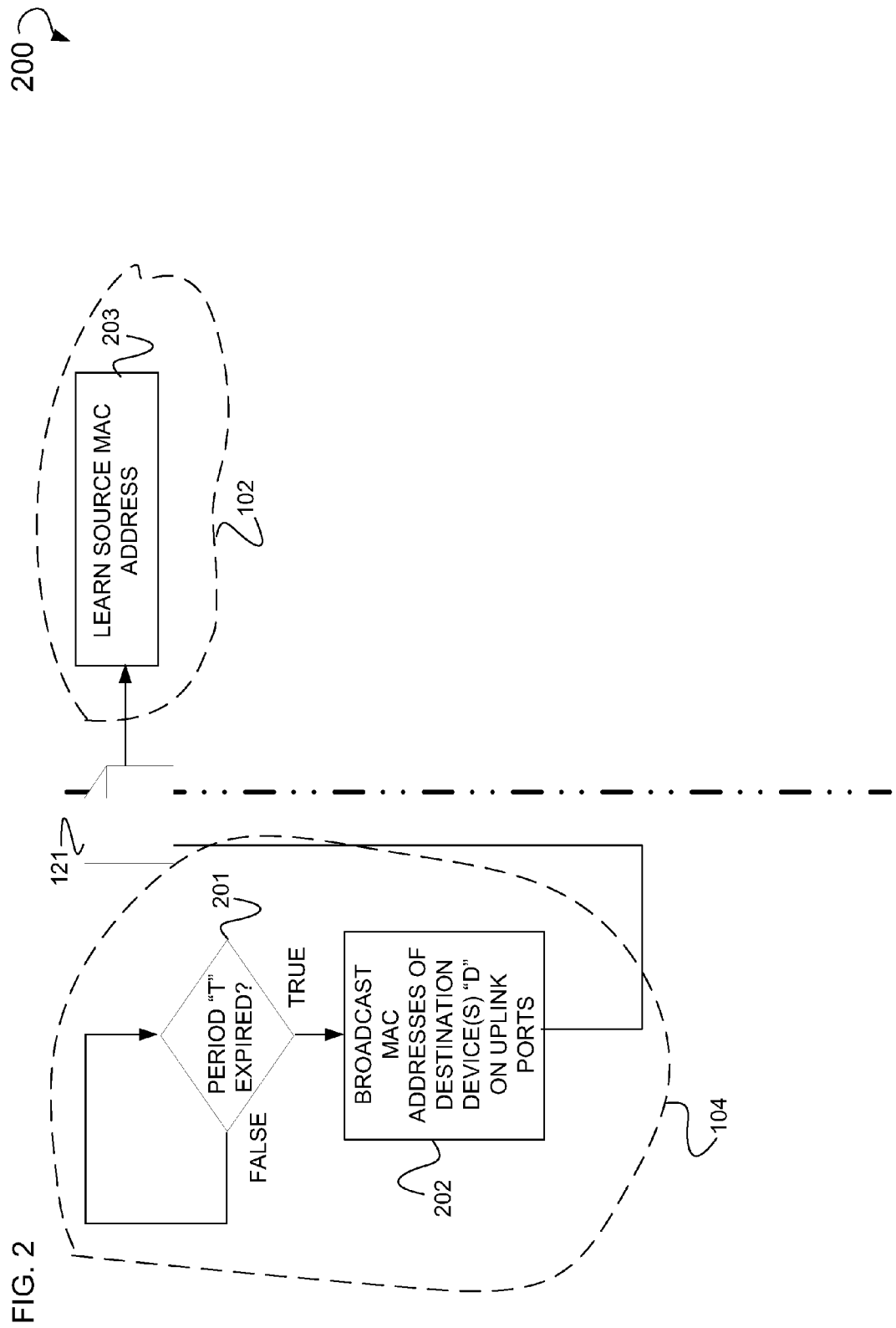
FIG. 2 is a dual-stream flow chart illustrating a method, according to an example embodiment, used to implement a time period based mechanism implemented to broadcast information about learned destinations that are assigned to downlinks for a given leaf device.

FIG. 2 is a dual-stream flow chart illustrating an example method 200 used to implement a time period based mechanism implemented to broadcast information about learned destinations that are assigned to downlinks for a given leaf device. Shown is a first stream that includes operations 201-202 that are executed by the leaf device 104. Also shown is a second stream that includes operation 203 that is executed by a top level device 102. Decision operation 201 is executed to determine whether a period "T" has expired. The period "T" is set by a system administrator or other suitable individual to determine when teaching via the regular broadcast of a teaching message is to occur. Here the teaching message may include the MAC address of one of the host devices 114-116. In cases where decision operation 201 evaluates to "false," decision operation 201 is re-executed. In cases where decision operation 201 evaluates to "true," operation 202 is executed. Operation 202 is executed to broadcast on an uplink port(s) a MAC address of a host device as part of the unsolicited teaching message 121. In some example embodiments, operation 202 is executed iteratively to broadcast a teaching message for each host device operatively connected to the leaf device via a downlink. As illustrated above, the unsolicited teaching messages 121 is broadcast on the uplink port connected to the links 119-120. Operation 203 is executed to learn the source MAC address of the host through, for example, updating the forwarding table of the top level device 102 with the MAC address of the host. This process of teaching and learning can be implemented throughout the multipath domain 123 such that the unsolicited teaching message 121 is propagated to other top level devices and leaf devices.

In one example embodiment, broadcasts from non-spanning tree top level switches are identified such that subsequent broadcasts from the non-spanning tree top level switch are deemed to be teaching messages. Where a teaching broadcast message is received by a leaf switch from a non-spanning-tree top level switch, then, after the learning processing completes, the teaching message is discarded (e.g., not forwarded to a host end station). A non-spanning-tree top level switch, as used herein, is a switch whose link to the leaf switch creates a cycle. This embodiment allows teaching messages to be sent through the non-spanning-tree top level switches without these teaching messages reaching a host end stations. Of note, however, is that any teaching messages that are sent through a spanning tree top level switch may reach a host end station.

Figure 3:
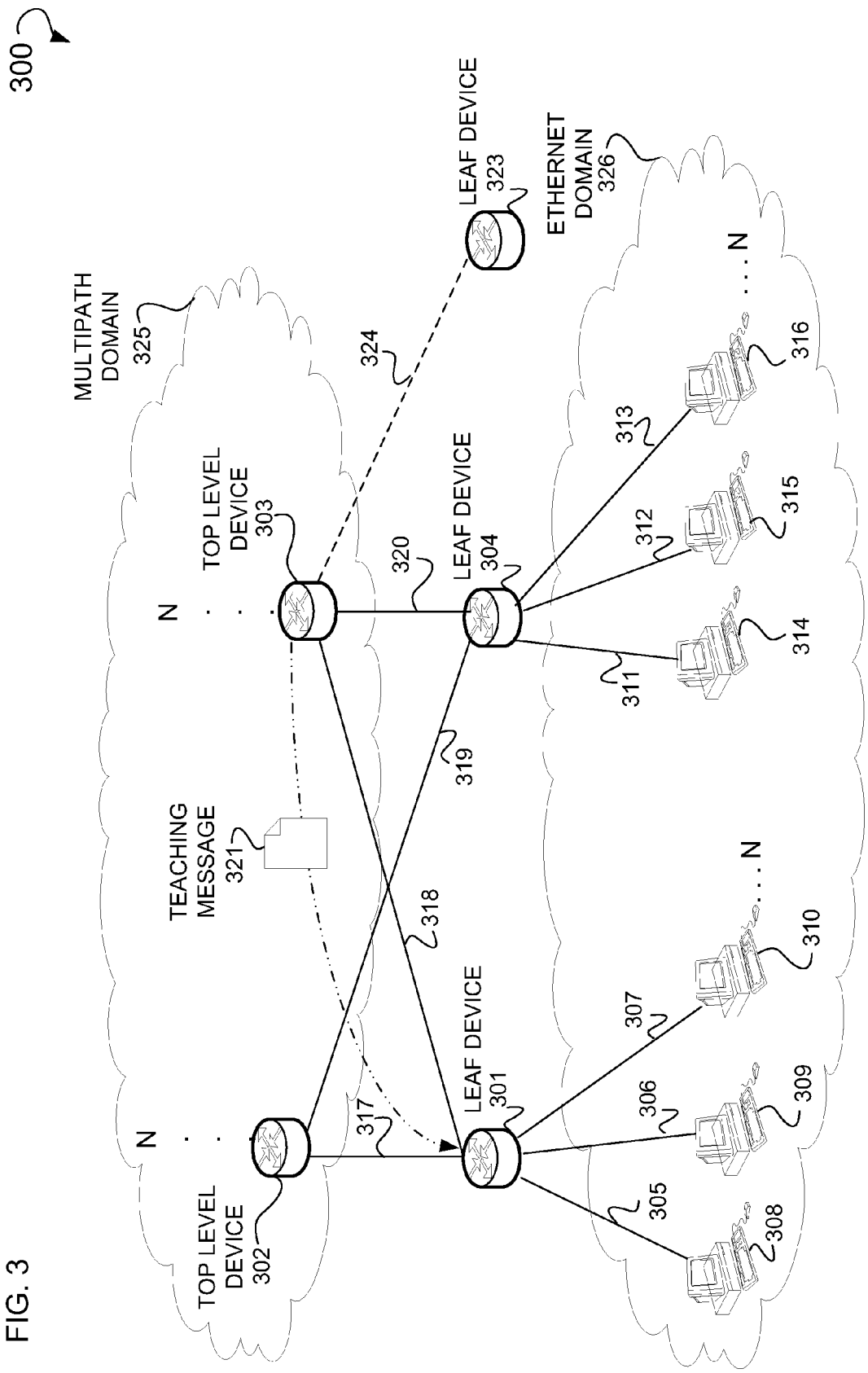
FIG. 3 is a diagram of a system, according to an example embodiment, used to broadcast teaching messages from non-spanning tree top level switches that are identified such that the broadcasts from these switch are deemed to be teaching messages.

FIG. 3 is a diagram of an example system 300 used to broadcast teaching messages from non-spanning tree top level switches that are identified such that subsequent broadcasts from these switch are deemed to be teaching messages. Illustrated is a leaf device 301 that is operatively connected to host devices 308-310. Host device 308 is connected to the leaf device 301 via the downlink 305. Host device 309 is connected to the leaf device 301 via the downlink 306. Host device 310 is connected to the leaf device 301 via the downlink 307. Also shown are host devices 314-316 that are operatively connected to the leaf device 304 via a plurality of downlinks. Host devices 308-310 and 314-316 are part of the ethernet domain 326. Leaf device 304 is connected to host device 314 via the downlink 311. Leaf device 312 is connected to host device 315 via downlink 312. Leaf device 304 is connected to host device 316 via link 313. Each of the leaf devices 301 and 304 are operatively connected to the top level devices 302 and 303. Specifically, the leaf device 301 is connected to the top level device 302 via the link 317, and is connected to the top level device 303 via the link 318. Further, the leaf device 304 is connected to the top level device 303 via the link 320, and to the top level device 302 via the link 319. Further, illustrated is a leaf device 323 that is connected to the top level device 303 via a link 324. Top level devices 302 and 303 are part of a multipath domain 325.

In some example embodiments, broadcasts from non-spanning tree top level switches are identified such that the broadcasts from these switches are deemed to be teaching messages. A non-spanning tree top level switch, as used herein, is a top level switch that is part of a cycle, and not a spanning tree. For example, as illustrated above the path 304→303→301→302→304 is a cycle. Given this cycle, any message sent from a top level device within this cycle to the leaf device 301 may be treated as a teaching message and, once processed, discarded or filtered by the leaf device 301. Discarded, as used herein, means, for example, not propagated to host devices 308-310 via a downlink 305-307. In contrast to the above illustrated cycle, in case where a top level device is part of a spanning tree, the teaching message is forwarded (i.e., propagated) to host devices. For example, the above illustrated path 323→303→301 is a spanning tree. Accordingly, the teaching message 321 is transmitted across is path 323→303→301 is forwarded to the host devices 308-310 along the downlinks 305-307. The teaching message 321 teaches the addresses of the host devices 314-316.

Figure 4:
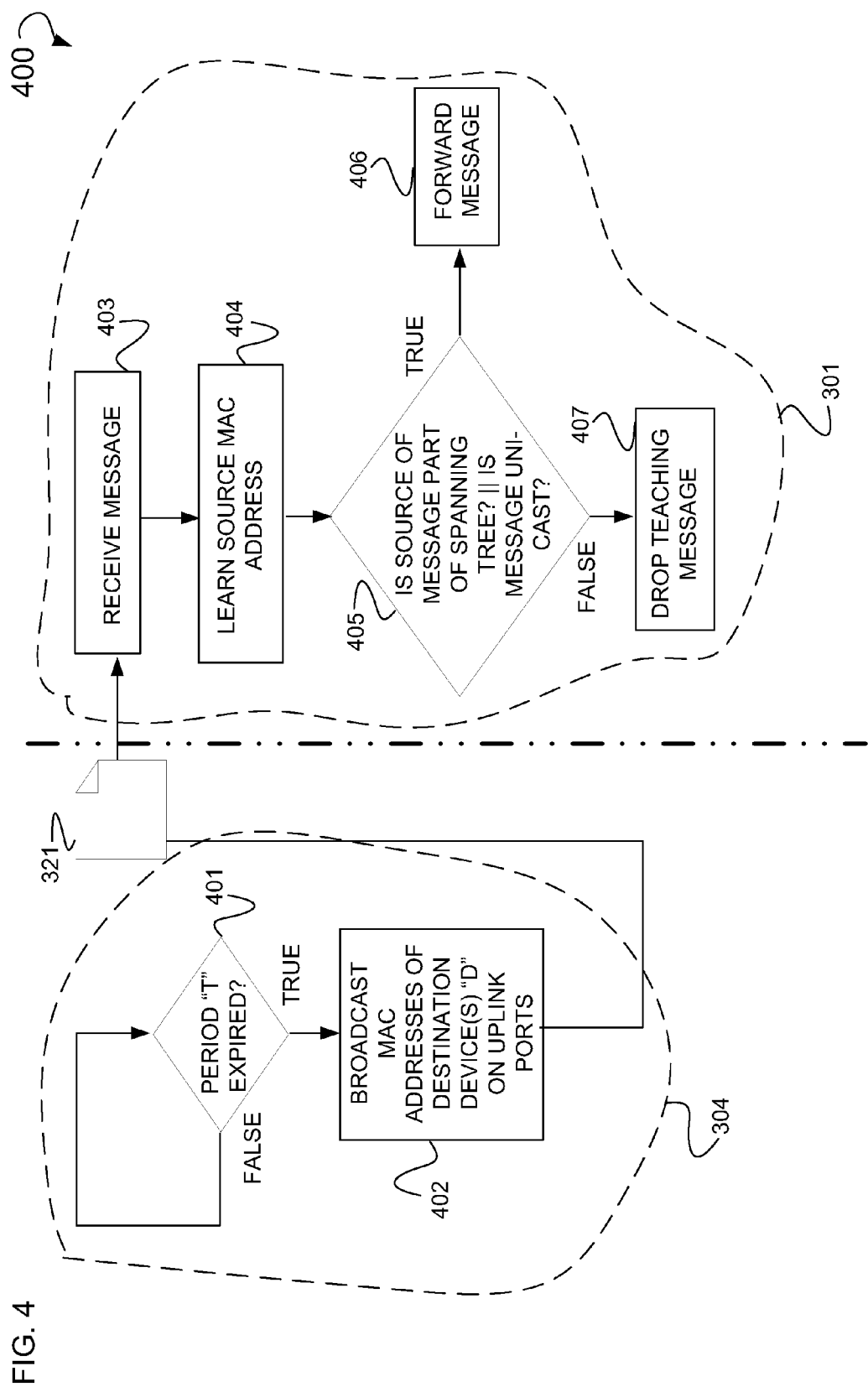
FIG. 4 is a dual-stream flow chart illustrating a method, according to an example embodiment, used to broadcast teaching messages from non-spanning tree top level switches that are identified such that the broadcasts from these switch are deemed to be teaching messages.

FIG. 4 is a dual-stream flow chart illustrating an example method 400 used to broadcast teaching messages from non-spanning tree top level switches that are identified such that the broadcasts from these switch are deemed to be teaching messages. Shown are operations 401-402 executed by the leaf node 304. Also shown are operations 403-407 that are executed by the leaf device 301. Decision operation 401 is executed to determine whether a period "T" has expired. The period "T" is set by a system administrator or other suitable individual to determine when teaching via the regular broadcast of a teaching message is to occur. In cases where decision operation 401 evaluates to "false," decision operation 401 is re-executed. In cases where decision operation 401 evaluates to "true," operation 402 is executed. Operation 402 is executed to broadcast on an uplink port(s) a MAC address of a host device as part of an unsolicited teaching message. In some example embodiments, operation 402 is executed iteratively to broadcast a teaching message for each host device operatively connected to the leaf device via a downlink. As illustrated above, the unsolicited teaching messages 321 is broadcast on the uplink port connected to the link 319. Operation 403 is executed to receive the teaching message 321. Operation 404 is executed to learn the source MAC address, where this source MAC address may be the MAC address for a host device 314-316. Decision operation 405 is executed to determine whether the input port that receives the teaching message is part of a spanning tree, or whether the teaching message has been unicast. Where either of these decisions evaluates to "true," an operation 406 is executed. In cases where both of these decisions evaluate to "false," an operation 407 is executed. The determination of whether a source of a message is part of spanning tree can be determined using the Spanning Tree Protocol (STP), a spanning tree algorithm, or other suitable algorithm. Operation 406 is executed to forward the teaching message 321 to host devices via a downlink. Operation 407 is executed to drop the teaching message. This process of teaching and learning can be implemented throughout the multipath domain 325 such that the unsolicited teaching message 321 is propagated to other top level devices and leaf devices.

In some example embodiments, a special type is used to denote a teaching message. As used herein, this special type is a numeric value used to denote a teaching message. Example types include a message type identifier (e.g., an Ethertype) inserted into the two-octet field of an Ethernet frame, or a message type identifier inserted into the ICMP type field of an ICMP header. This numeric value may be a hexadecimal value used to distinguish a teaching message from other messages. These messages may be transmitted using an Ethernet frame, or an ICMP header. Where a leaf switch receives a message that includes this special type the leaf switch learns (e.g., records the source MAC address in a forwarding table) and discards the teaching message. This prevents any teaching message from reaching host end stations.

Figure 5:
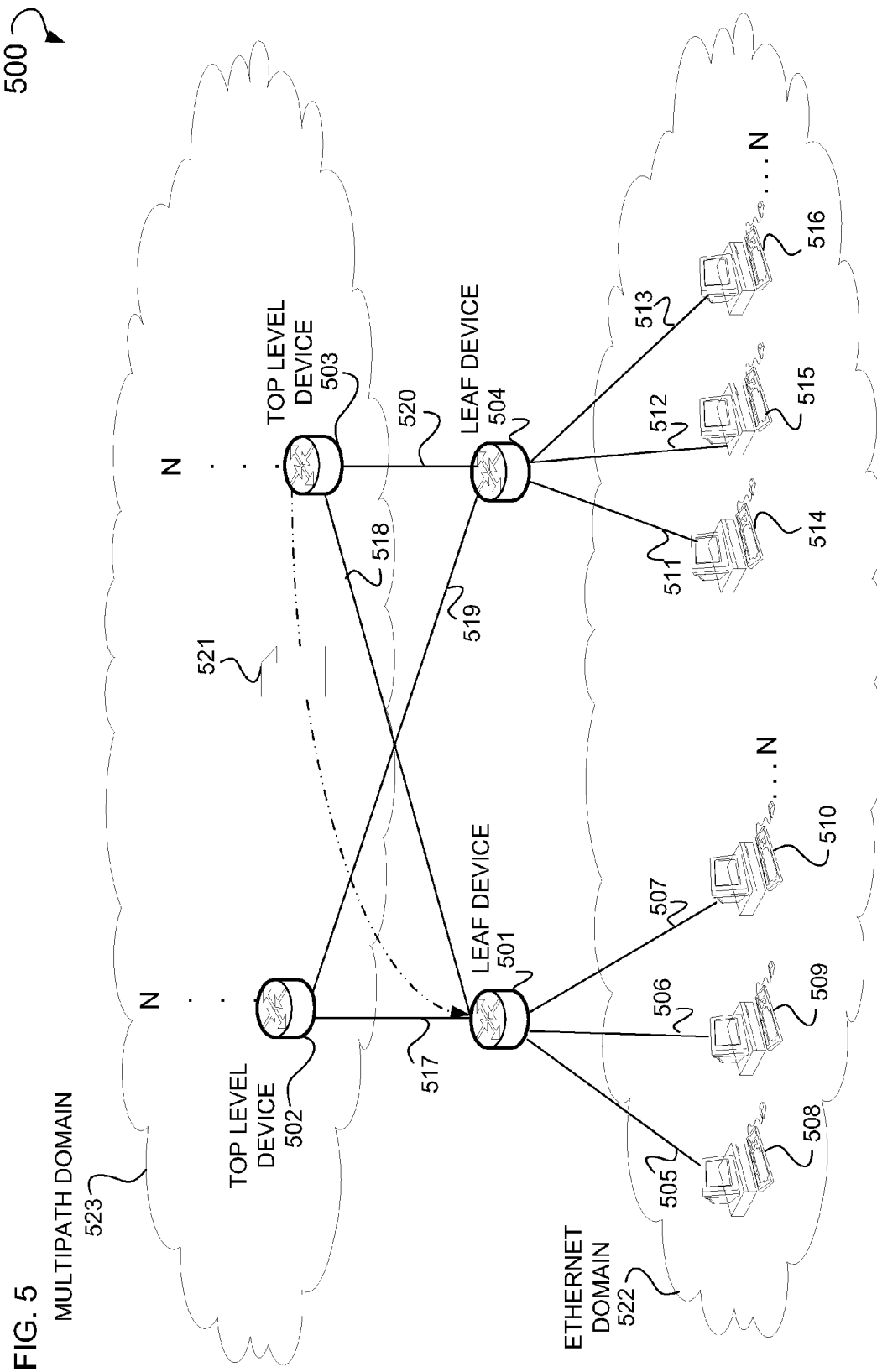
FIG. 5 is a diagram of a system, according to an example embodiment, that uses a special type to denote a teaching message.

FIG. 5 is a diagram of an example system 500 that uses a special type to denote a teaching message. Illustrated is a leaf device 501 that is operatively connected to host devices 508-510. Host device 508 is connected to the leaf device 501 via the downlink 505. Host device 509 is connected to the leaf device 501 via the downlink 506. Host device 510 is connected to the leaf device 501 via the downlink 507. Also shown are host devices 514-516 that are operatively connected to the leaf device 504 via a plurality of downlinks. Host devices 508-510 and 514-516 are part of the ethernet domain 522. Leaf device 504 is connected to host device 514 via the downlink 511. Leaf device 512 is connected to host device 515 via downlink 512. Leaf device 504 is connected to host device 516 via link 513. Each of the leaf devices 501 and 504 are operatively connected to the top level devices 502 and 503. Specifically, the leaf device 501 is connected to the top level device 502 via the link 517, and is connected to the top level device 503 via the link 518. Further, the leaf device 504 is connected to the top level device 503 via the link 520, and to the top level device 502 via the link 519. A teaching message 521 is illustrated that used a special type to teach the receiving leaf device 501. Top level device 502 and 503 are part of a multipath domain 523.

Figure 6:
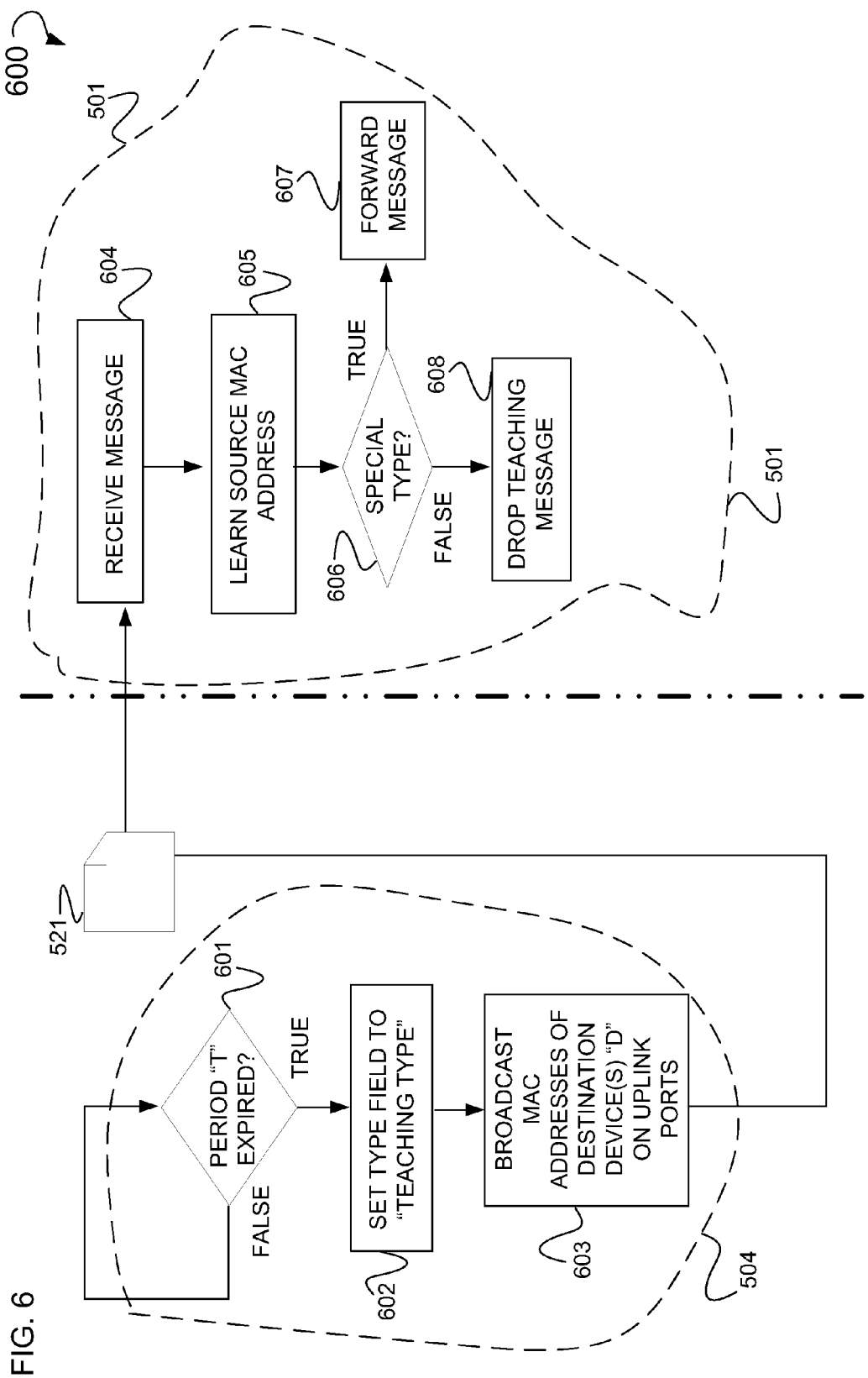
FIG. 6 is a dual-stream flow chart illustrating a method, according to an example embodiment, that uses a special type to denote a teaching message.

FIG. 6 is a dual-stream flow chart illustrating an example method 600 that uses a special type to denote a teaching message. Shown are operations 601-603 that are executed by the leaf device 504. Also shown are operation 604-608 that are executed by leaf device 501. Decision operation 601 is executed to determine whether a period "T" has expired. The period "T" is set by a system administrator or other suitable individual to determine when teaching via the regular broadcast of a teaching message is to occur. In cases where decision operation 401 evaluates to "false," decision operation 601 is re-executed. In cases where decision operation 601 evaluates to "true," operation 602 is executed. Operation 602 is executed to set the type field of a message to a numeric value used to denote a message that is a teaching message (i.e., a teaching type). Operation 603 is executed to broadcast on an uplink port(s) a MAC address of a host device as part of an unsolicited teaching message. In some example embodiments, operation 603 is executed iteratively to broadcast a teaching message for each host device operatively connected to the leaf device via a downlink. Operation 604 is executed to receive the teaching message 521. Operation 605 is executed to learn the source MAC address the host devices 514-516. Decision operation 605 is executed to determine whether the teaching message 521 includes a special type used to denote a teaching message. In cases where the decision operation 605 evaluates to "false," an operation 608 is executed to drop the teaching message. In cases where decision operation 605 evaluates to "true," an operation 607 is executed. Operation 607 is executed to forward the teaching message. This process of teaching and learning can be implemented throughout the ether domain 522 such that the unsolicited teaching message 521 is propagated to other top level devices and leaf devices.

In one example embodiment, a unicast teaching message is periodically sent to each top level device entry in the learning table of a leaf device. Each unicast teaching message is sent from a single source to a single destination. In this approach, a unicast teaching message is sent along every message path where teaching is to occur. A unicast teaching message can be addressed to, and sent to, each top level switch. This action is periodically performed for all entries in each leaf switches' learning table. A learning table as used herein is a type of forwarding table. This teaching message teaches top level switches destination information and the teaching messages terminate at the receiving top level switch and would not propagate beyond the top level switch to other end station destinations. In some example embodiments, a central manager can provide a table that identifies addresses of top level switches, as these addresses are stored within each leaf switch. In the case where all top switches are directly connected to the leaf switch, the leaf switch can use a low level protocol such as the Link Layer Discovery Protocol (LLDP) to discover the address of top level switches.

Figure 7:
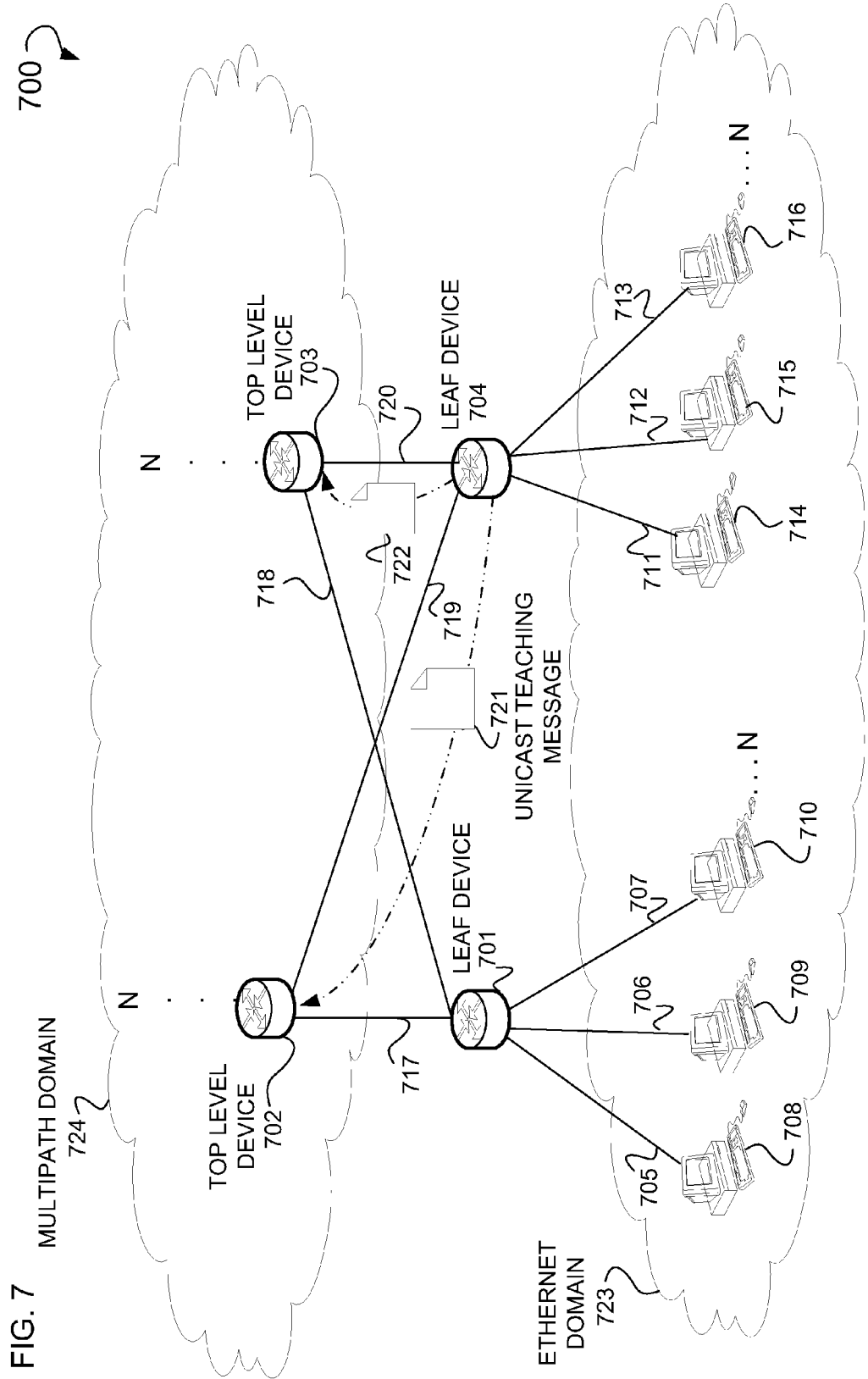
FIG. 7 is a diagram of a system, according to an example embodiment, used to unicast a teaching message that is periodically sent to each top level device entry in the learning table of a leaf device.

FIG. 7 is a diagram of an example system 700 used to unicast a teaching message that is periodically sent to each top level device entry in the learning table of a leaf device. Illustrated is a leaf device 701 that is operatively connected to host devices 708-710. Host device 708 is connected to the leaf device 701 via the downlink 705. Host device 709 is connected to the leaf device 701 via the downlink 706. Host device 710 is connected to the leaf device 701 via the downlink 707. Also shown are host devices 714-716 that are operatively connected to the leaf device 704 via a plurality of downlinks. Host devices 708-710 and 714-716 are part of the ethernet domain 723. Leaf device 704 is connected to host device 714 via the downlink 711. Leaf device 712 is connected to host device 715 via downlink 712. Leaf device 704 is connected to host device 716 via link 713. Each of the leaf devices 701 and 704 are operatively connected to the top level devices 702 and 703. Specifically, the leaf device 701 is connected to the top level device 702 via the link 717, and is connected to the top level device 703 via the link 718. Further, the leaf device 704 is connected to the top level device 703 via the link 720, and to the top level device 702 via the link 719. A teaching message 721 is illustrated that is unicast by the leaf device 704 to teach the top level device 702. Further, a unicast teaching message 722 is sent to the top level device 703 by the leaf device 704. Top level device 702 and 703 are part of a multipath domain 724.

Figure 8:
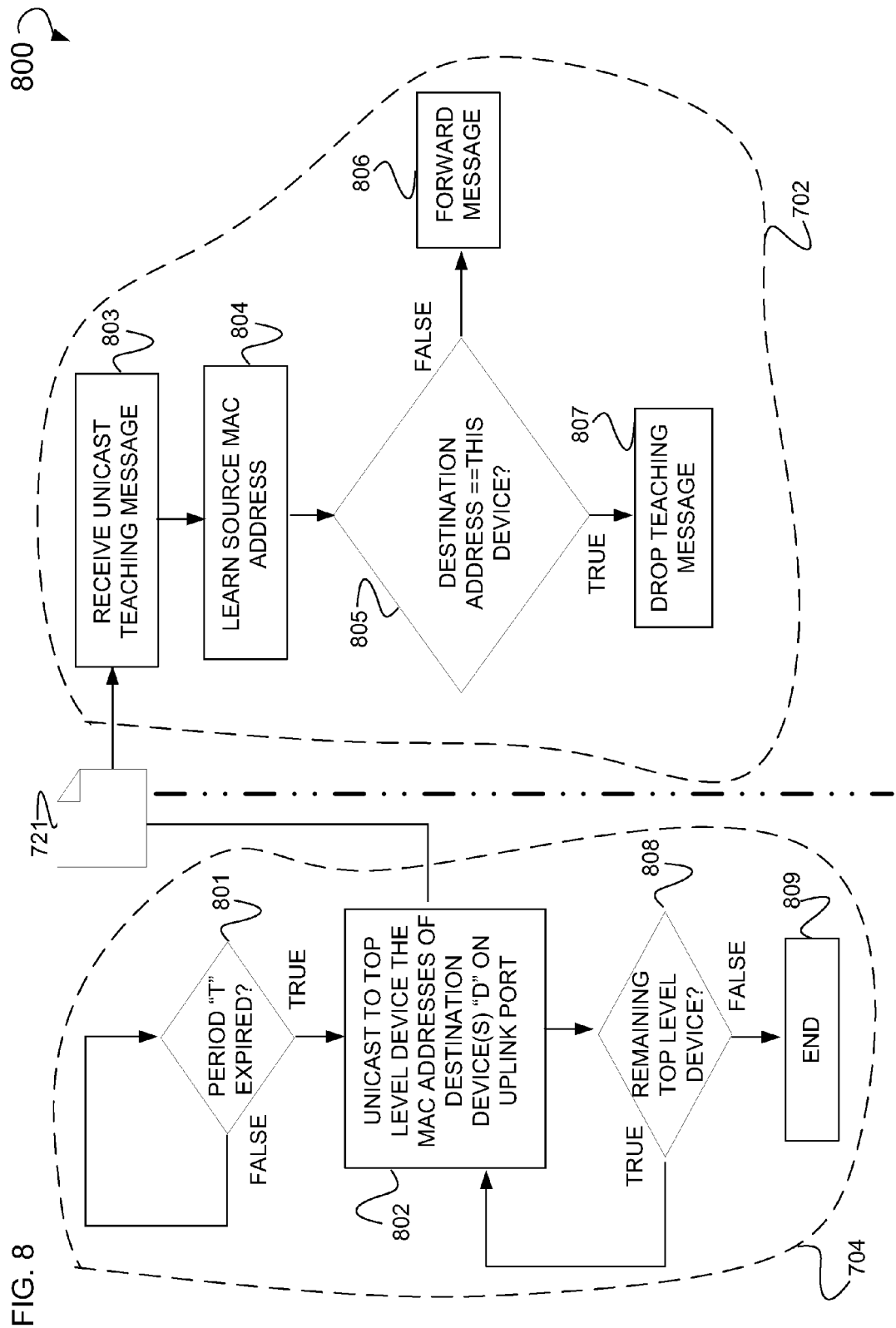
FIG. 8 is a dual-stream flow chart illustrating a method, according to an example embodiment, used to unicast a teaching message that is periodically sent to each top level device entry in the learning table of a leaf device.

FIG. 8 is a dual-stream flow chart illustrating an example method 800 used to unicast a teaching message that is periodically sent to each top level device entry in the learning table of a leaf device. Shown are operations 801-802, and 808-809 that are executed by the leaf device 704. Also shown are operations 803-807 that are executed by the top level device 702. Illustrated is a decision operation 801 that determines whether a period of time "T" has expired. The period "T" is set by a system administrator or other suitable individual to determine when teaching via the regular unicast of a teaching message is to occur. In cases where decision operation 801 evaluates to "false," decision operation 801 is re-executed. In cases where decision operation 801 evaluates to "true," operation 802 is executed. Operation 802 is executed to unicast to a top level device the MAC addresses of destination device "D" (i.e., host devices operatively connected to the leaf device), as a teaching message, on an individual uplink port. Decision operation 808 is executed to determine whether a remaining top level device exists that is to be unicasted a teaching message. In cases where decision operation 808 evaluates to "true," operation 802 is re-executed. In cases where decision operation 808 evaluates to "false," operation 809 is executed and the method terminated. Operation 803 is executed to receive the unicast teaching message 803. Operation 804 is executed to learn the source MAC address, where the source MAC address is the address of the one of the host devices 714-716. A decision operation 805 is executed to determine whether the destination address is this device (i.e., the device receiving the teaching message). In cases where decision operation 805 evaluates to "true," an operation 807 is executed and the teaching message is dropped. In cases where decision operation 805 evaluates to "false," operation 806 is executed. Operation 806 is executed to forward the teaching message.

In one example embodiment, unicast teaching is performed through identifying a minimal set of top level and leaf switches that can be used to teach devices on paths where teaching is to occur. As a threshold matter, when a unicast teaching message is sent from a leaf switch to a top level (or leaf) switch, and intervening top switches are taught. If the topology is known, it is possible to construct a minimal set of top level and leaf switches that represent the paths where teaching needs to occur. In one example embodiment, each teaching leaf switch includes a table that indicates a set of top level (or leaf) switches that are sufficient to perform all required teaching. These tables may be calculated by a fabric manager that has an overview of the fabric topology. The following example can illustrate such optimization. Assume a fat tree with a set of "T" top level unary switches and "L" leaf switches. Using the solution described above (See FIG. 7), a leaf switch would need to send $T*(L-1)$ messages for each address (e.g., one per leaf switch on all uplinks). However, as illustrated below, sending to a single leaf switch is enough to teach a top level unary switch. As shown, only a single address needs to be discovered and known, as opposed to the address of all top level unary switches. In some example embodiments, unicast teaching performed through identifying a minimal set of top level and leaf switches can be used to optimize the sending of a teaching message to every top level switch (e.g., a top level switch in a Local Area Network (LAN) or VLAN) by a leaf switch.

Figure 9:
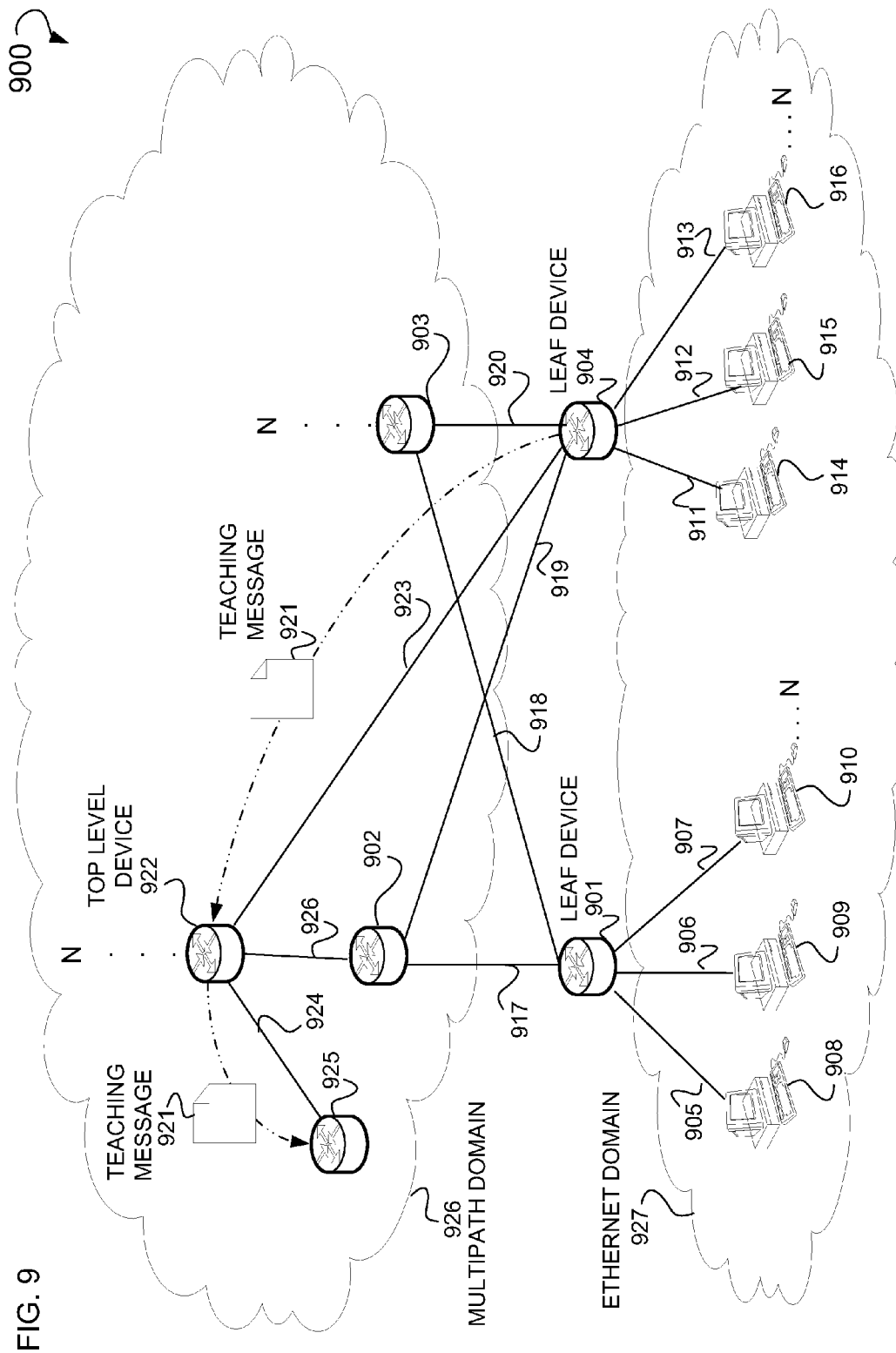
FIG. 9 is a diagram of a system, according to an example embodiment, illustrating unicast teaching that is performed through identifying a minimal set of top level and leaf switches that can be used to teach devices on paths where teaching is to occur.

FIG. 9 is a diagram of an example system 900 illustrating unicast teaching that is performed through identifying a minimal set of top level and leaf switches that can be used to teach devices on paths where teaching is to occur. Illustrated is a leaf device 901 that is operatively connected to host devices 908-910. Host device 908 is connected to the leaf device 901 via the downlink 905. Host device 909 is connected to the leaf device 901 via the downlink 906. Host device 910 is connected to the leaf device 901 via the downlink 907. Also shown are host devices 914-916 that are operatively connected to the leaf device 904 via a plurality of downlinks. Host devices 908-910 and 914-916 are part of the ethernet domain 927. Specifically, leaf device 904 is connected to host device 914 via the downlink 911. Leaf device 912 is connected to host device 915 via downlink 912. Leaf device 904 is connected to host device 916 via link 913. Each of the leaf devices 901 and 904 are operatively connected to the top level devices 902 and 903. Specifically, the leaf device 901 is connected to the top level device 902 via the link 917, and is connected to the top level device 903 via the link 918. Further, the leaf device 904 is connected to the top level device 903 via the link 920, and to the top level device 902 via the link 919.

Moreover, a top level device 922 is connected to the leaf device 904 via the link 923. A link 924 connects the top level device 922 and the top level device 925. A link 926 connects to the top level device 922 and the top level device 902. A teaching message 921 is illustrated that is unicast by the leaf device 904 to teach the top level device 925. This teaching message 921 is unicast along a path 904→922→925 such that the top level device 922 is also taught by the teaching message 921. Due to the unicasting of the teaching message 921 along this path, the top level device 922 need not be taught separately from the top level device 925. As described above, this teaching message 921 may include the MAC address of a host device "D" operatively connected to the leaf device 904 so as to allow the leaf device 904 to impersonate the host device "D." These host devices include devices 914-916. The top level devices 902, 903, 922, and 925 are part of the multipath domain 927.

Figure 10:
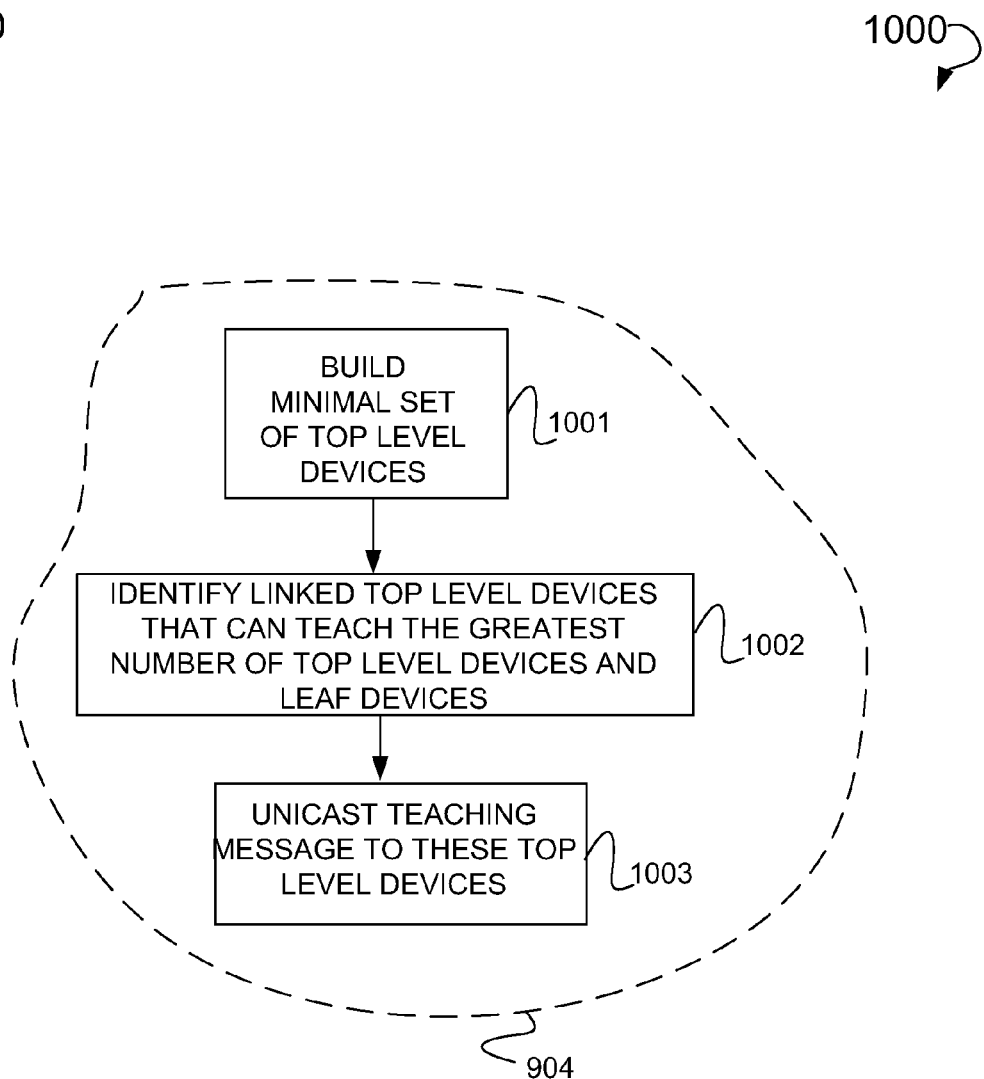
FIG. 10 is a flow chart illustrating a method, according to an example embodiment, showing teaching that is performed through identifying a minimal set of top level and leaf switches that can be used to teach devices on paths where teaching is to occur.

FIG. 10 is a flow chart illustrating an example method 1000 showing teaching that is performed through identifying a minimal set of top level and leaf switches that can be used to teach devices on paths where teaching is to occur. Operations 1001-1003 are illustrated that are executed by the leaf device 904. Operation 1001 is executed to build a set of minimal top level devices. A minimal set of top level devices, as used herein, is the set of top level devices that creates the largest spanning tree with the fewest number of devices (e.g., vertices). A minimum spanning tree algorithm such as Prim's algorithm, Kruskal's algorithm, breadth first search, depth first search, or some other minimal spanning tree algorithm may be used to find this set. Operation 1002 is executed to identify the top level devices (i.e., a key top level device) that can teach the greatest number of top level switches and leaf switches. This top level switch may be that top level switch in the set of minimal top level devices that has the largest number of physical or logical connections within the set of minimal top level devices. Largest, as used herein, is denotes greater than another top level switch within the set of minimal top level devices. Operation 1003 is executed to unicast a teaching message 921 to these top level devices 922 and 925.

In one example embodiment, a leaf switch tracks the teaching history for messages received by the leaf device via a top level switch. For example, whenever a message from a source address "S" is sent through a top level switch "T," an entry (S, T, A=0) is entered into the teaching table indicating that top switch "T" has been taught source address "S" at current count age zero. A teaching table, as used herein, is a table that includes the above defined entries, the table used to track the teaching of a device using teaching messages. Entries in the table can be periodically aged by incrementing the age count. If another message is sent from "S" through top level switch "T," then the age of the "S," "T" entry is refreshed to zero. When any entry achieves an excessive age, the entry may be dropped and forgotten. An excessive age, as used herein, is a predefined time value set by a system administrator or other suitable person.

In some example embodiments, a leaf switch may periodically walk (i.e., traverses) its forwarding table to identify end station sources "S" (e.g., a host device operatively coupled to another leaf device) that are known to be sending messages through a downlink that is attached to this leaf switch. For each source "S" that is active in the forwarding table, the teaching table is consulted to identify all "S" unaware top switches (i.e., a top level switch that does not know the location of "S") that have not been recently taught the origin location for "S." Recently taught, as used herein, is a time value that is less than a predefined time value set by a system administrator or other suitable person. A teaching message is constructed by the leaf using one of the techniques described above (see e.g., FIGS. 1-10 and the description associated therewith) and is sent to "S" unaware top level switches. In some example cases, a broadcast teaching message or one or more unicast teaching messages are constructed and sent through the given "S" unaware top level switches. The forwarding table and the teaching table may be combined into a single table that combines the source address, end-station port location, and a separate top switch age vector entry for each top switch.

Figure 11:
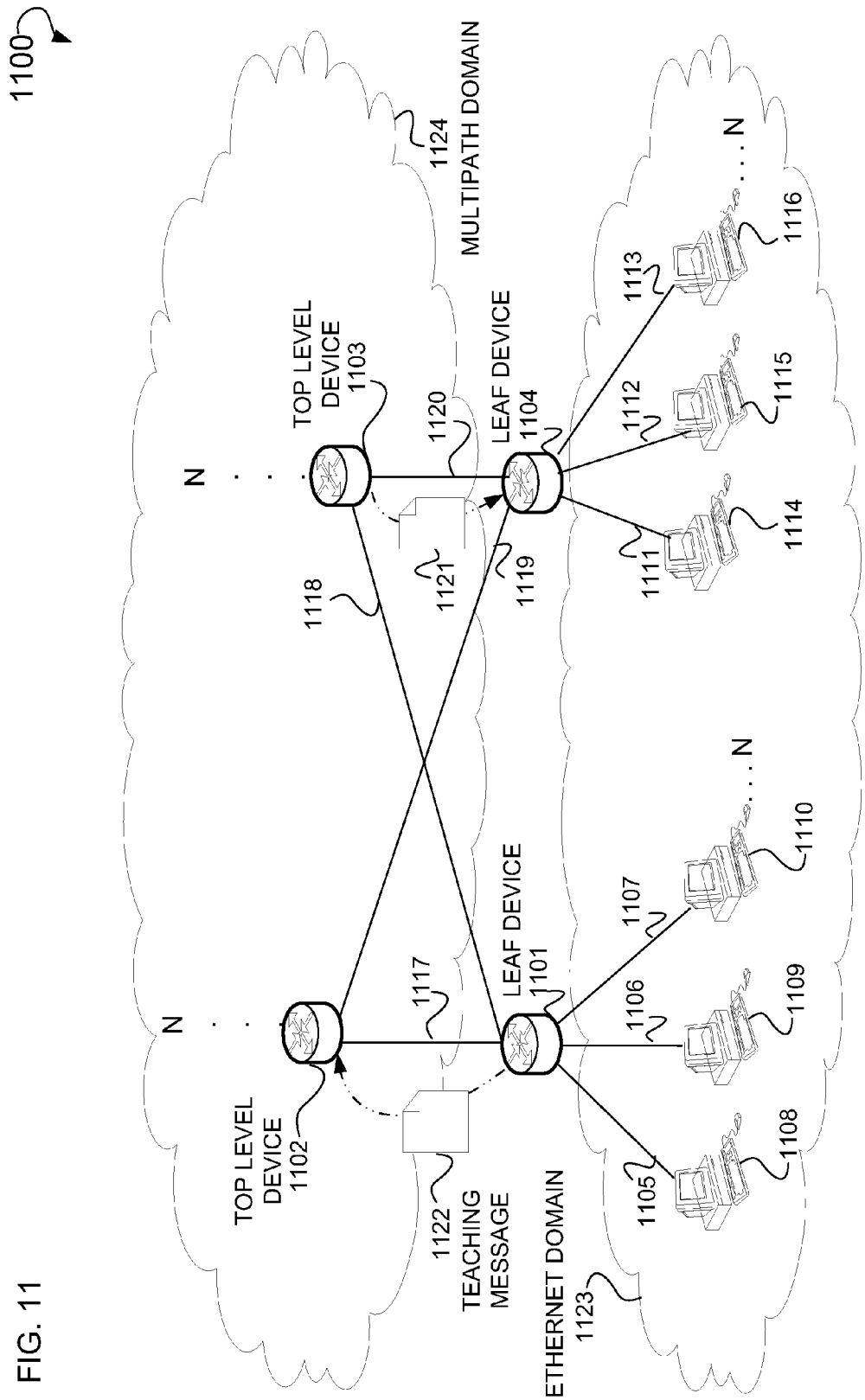
FIG. 11 is a diagram of a system, according to an example embodiment, illustrating a leaf switch that track the teaching history for messages received by the leaf device via a top level switch.

FIG. 11 is a diagram of an example system 1100 illustrating a leaf switch that track the teaching history for messages received by the leaf device via a top level switch. Illustrated is a leaf device 1101 that is operatively connected to host devices 1108-1110. Host device 1108 is connected to the leaf device 1101 via the downlink 1105. Host device 1109 is connected to the leaf device 1101 via the downlink 1106. Host device 1110 is connected to the leaf device 1101 via the downlink 1107. Also shown are host devices 1114-1116 that are operatively connected to the leaf device 1104 via a plurality of downlinks. Host devices 1108-1110 and 1114-1116 are part of the ethernet domain 1123. Leaf device 1104 is connected to host device 1114 via the downlink 1111. Leaf device 1112 is connected to host device 1115 via downlink 1112. Leaf device 1104 is connected to host device 1116 via link 1113. Each of the leaf devices 1101 and 1104 are operatively connected to the top level devices 1102 and 1103. Specifically, the leaf device 1101 is connected to the top level device 1102 via the link 1117, and is connected to the top level device 1103 via the link 1118. Further, the leaf device 1104 is connected to the top level device 1103 via the link 1120, and to the top level device 1102 via the link 1119. As illustrated, in some example embodiments, the leaf device 1104 tracks the massages (e.g., message 1121) that are sent from the top level device 1103 for the purpose of determining whether the top level device 1103 has been taught. Additionally, the leaf device 1101 may generate and send a teaching message 1122 to a top level device 1102, where the leaf device 1101 periodically walks its forwarding table to identify end station sources "S" that are known to be sending messages through a downlink that is attached to this leaf switch. The top level devices 1102 and 1103 are part of a multipath domain 1124.

Figure 12:
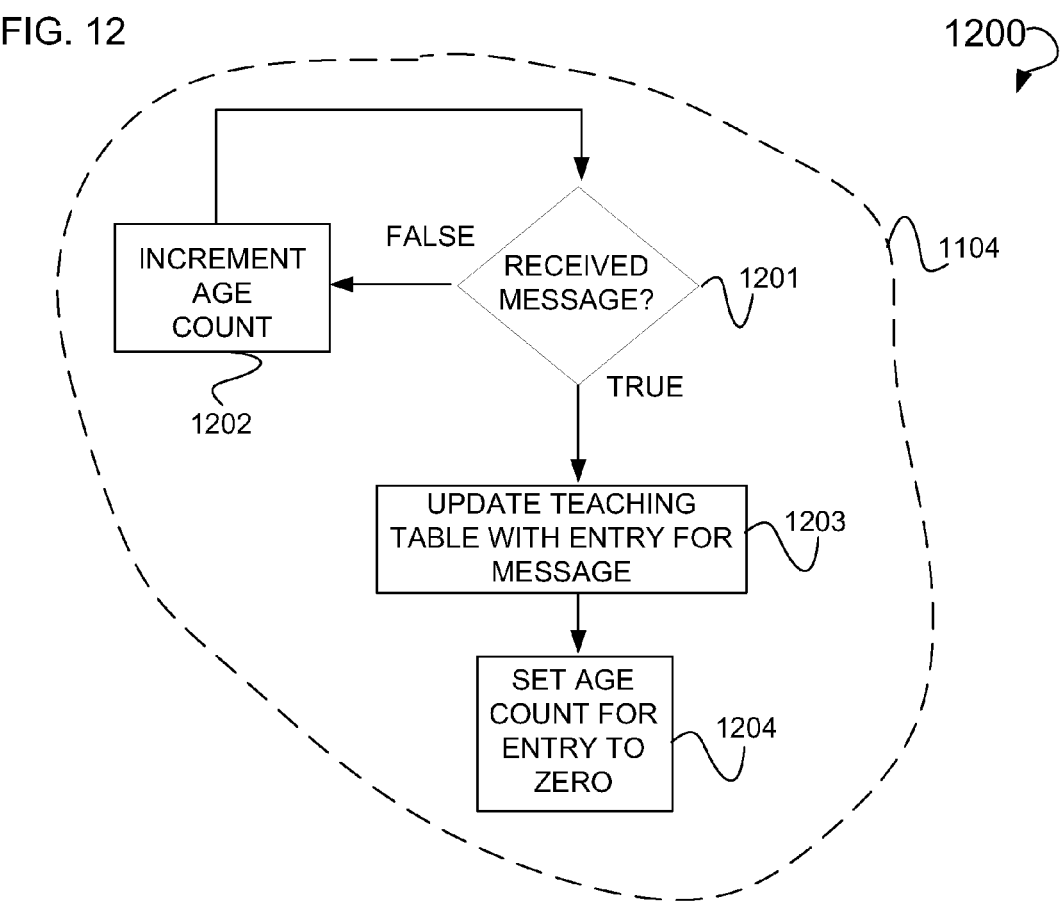
FIG. 12 is a flow chart illustrating a method, according to an example embodiment, shown to track the teaching history for messages received by the leaf device via a top level switch.

FIG. 12 is a flow chart illustrating an example method 1200 shown to track the teaching history for messages received by the leaf device via a top level switch. Illustrated as operations 1201-1204 that are executed by the leaf device 1104. Decision operation 1201 is executed to determine whether a message has been received. In cases where decision operation 1201 evaluates to "false," an operation 1202 is executed and the count age is incremented. In cases where decision operation 1201 evaluates to "true," operation 1203 is executed. Operation 1203 is executed to update teaching table with an entry for the message. Operation 1204 is executed to set an age count for the entry to zero.

Figure 13:
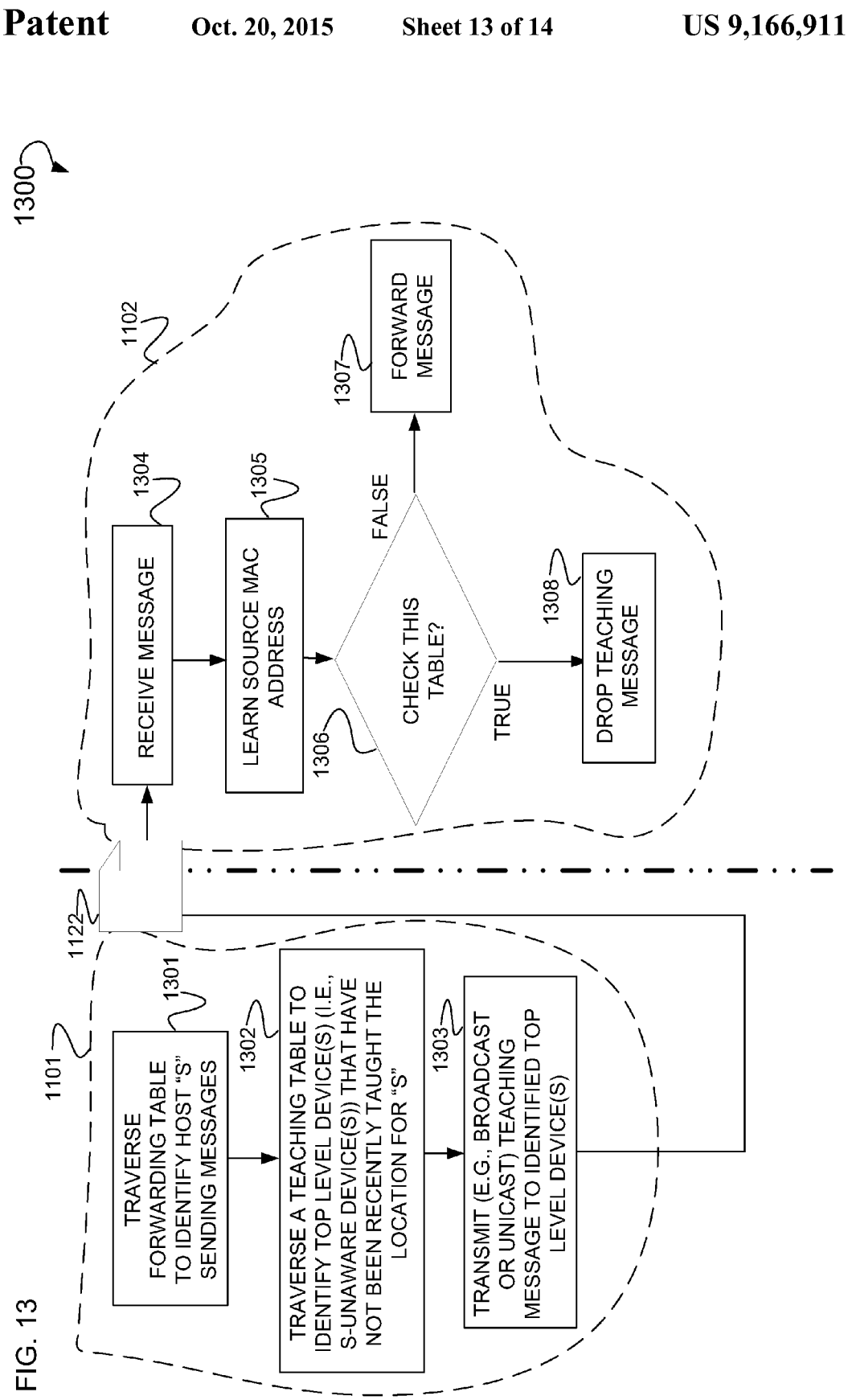
FIG. 13 is a dual-stream flow chart illustrating a method, according to an example embodiment, used by a leaf switch to periodically walk a forwarding table to identify end station sources "S" that are known to be sending messages through a downlink that is attached to this leaf switch.

FIG. 13 is a dual-stream flow chart illustrating an example method 1300 used by a leaf switch to periodically walk a forwarding table to identify end station sources "S" that are known to be sending messages through a downlink that is attached to this leaf switch. Shown are various operations 1301-1303 that are executed by the leaf device 1101. Also shown are operations 1304-1308 that are executed by the top level device 1102. Operation 1301 is executed to traverse the forwarding table to identify a host "S" sending messages. Operation 1302 is executed to traverse a teaching table to identify top level devices (e.g., "S" unaware devices) that have not been recently taught. Identify is via, for example, a unique numeric identifier (e.g., a MAC address) associated with the top level device. Operation 1303 is executed to transmit a (e.g., unicast, or broadcast) a teaching message to the above identified top level device. The teaching message 1122 includes the MAC address of a host device "D" (e.g., host devices 1108-1110) included as part of the above described impersonation regime. Operation 1304 is executed to receive an unsolicited teaching message. Operation 1305 is executed to learn a source MAC address that may includes the MAC address of the host devices 1108-1110. Decision operation 1306 is executed to determine whether the forwarding table for this top level device includes the MAC address in the teaching message 1122. In example cases where the decision operation 1306 evaluates to "true," an operation 1308 is executed to drop the teaching message. In example cases where the decision operation 1305 evaluates to "false," an operation 1307 is executed to forward the teaching message 1122.

Figure 14:
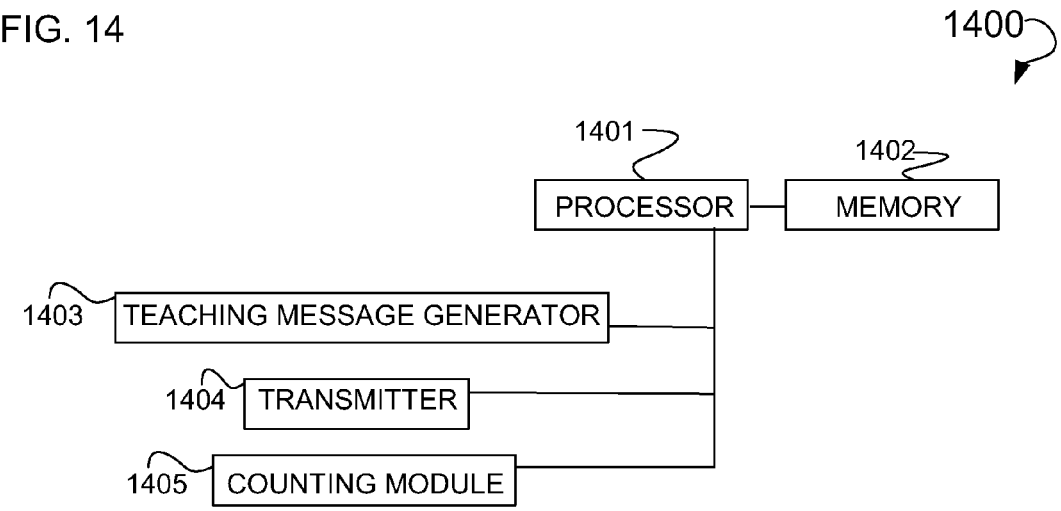
FIG. 14 is a block diagram of an alternative example embodiment in the form of a network device used to generate and transmit a teaching message.

FIG. 14 is a block diagram of an alternative example embodiment in the form of a network device 1400 used to generate and transmit a teaching message. These various blocks may be implemented in hardware, firmware, or software. Further, these various blocks are logically or physically connected. Examples of the network device 1400 include the leaf devices 104, 304, 504, and 704. Shown is a processor 1401 and a memory 1402 operatively connected to the processor 1401. Memory 1402 may be persistent or non-persistent memory. Operatively connected to the processor 1401 is a teaching message generator 1403 to generate a teaching message with a host device address that impersonates a device source address, the impersonation to instruct an additional network device as to the host device address. Operatively connected to the processor 1401 is a transmitter 1404 to transmit the teaching message to the additional network device. In some example embodiments, the network device is a leaf device, and the additional network device is a top level device. In some example embodiments, the teaching message generator generates the teaching message for a subset of a set of host devices found in a forwarding table of the network device. In some example embodiments, the teaching message includes a special type to identify the teaching message. In some example embodiments, transmit includes at least one of broadcast, or unicast. Further, some example embodiments include the transmitter 1404 transmitting to the additional network device, the additional network device not part of a spanning tree. The teaching message may be formatted using at least one of a specific Ethernet protocol type, or an ICMP. Operatively connected to the processor 1401 is a counting module 1405 to determine that a period has expired after which the teaching message is transmitted.

Figure 15:
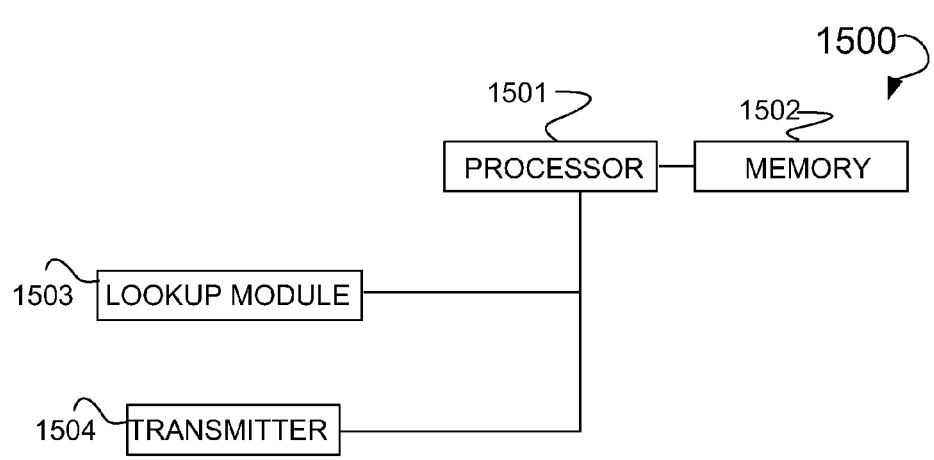
FIG. 15 is a block diagram of an alternative example embodiment in the form of a network device used to generate a teaching message on a periodic basis.

FIG. 15 is a block diagram of an alternative example embodiment in the form of a network device 1500 used to generate a teaching message on a periodic basis. These various blocks may be implemented in hardware, firmware, or software. Further, these various blocks are logically or physically connected. Shown is a processor 1501 and a memory 1502 operatively connected to the processor 1501. Memory 1502 may be persistent or non-persistent memory. Examples of the network device 1500 include the leaf devices 1104. Operatively connected to the processor 1501 is a forwarding table lookup module 1503 to traverse a forwarding table to identify an additional network device that has yet to receive a teaching message since an expiration of a predefined threshold value, the teaching message to relate to a source device. Operatively connected to the processor 1501 is a transmitter 1504 to transmit a teaching message to the additional network device. In some example embodiments, the predefined threshold value is a period of time. In some example embodiments, the transmitter 1504 unicasts the teaching message on an uplink port a used to connect a link to the additional network device. The transmitter may unicast the teaching message on an uplink port that is indirectly connected through another network device to the additional network device. In some example embodiments, the network device is a leaf device, and the additional network device is a top level device.

Figure 16:
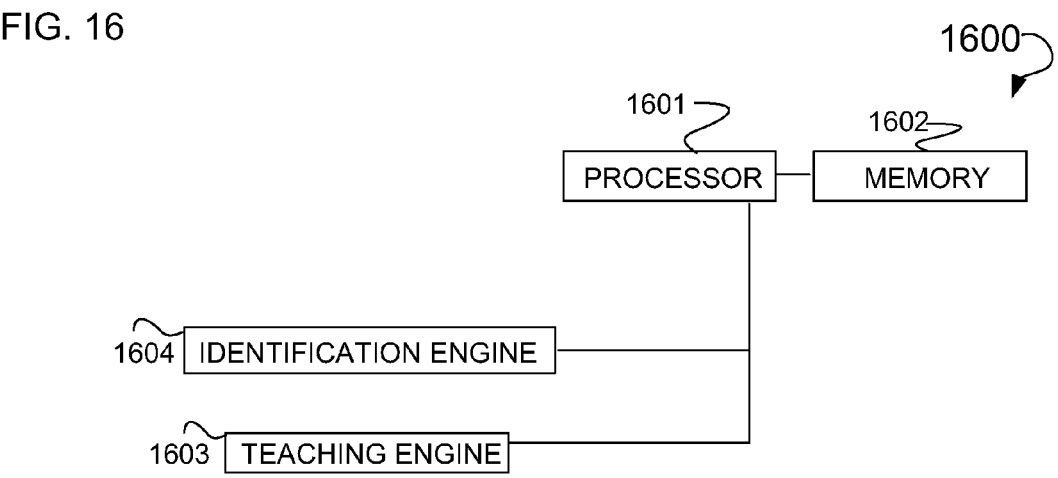
FIG. 16 is a block diagram of an alternative example embodiment in the form of a network device used to transmit a teaching message to a key network device that is part of a minimal set of network devices.

FIG. 16 is a block diagram of an alternative example embodiment in the form of a network device 1600 used to transmit a teaching message to a key network device that is part of a minimal set of network devices. These various blocks may be implemented in hardware, firmware, or software. Further, these various blocks are logically or physically connected. Shown is a processor 1601 and a memory 1602 operatively connected to the processor 1601. Memory 1602 may be persistent or non-persistent memory. Examples of the network device 1600 include the leaf device 904. Operatively connected to the processor 1601 is a teaching engine 1603 to teach an address of a host device, the teaching engine to teach via a unicast of a teaching message to a target device that is part of a set of device that are connected to the leaf device via a path. Operatively connected to the processor 1601 is an identification engine 1604 to identify a subset of the set of devices, connected to the leaf device via the path, that are taught as a result of the unicast of the teaching message to the target device. In some example embodiments, the identification engine 1604 identifies information related to connectivity of the set of device that is connected to the leaf device via the path.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

In some example embodiments, the methods illustrated herein are stored and implemented as part of one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations there from. It is intended that the appended claims cover such modifications and variations as fall within the "true" spirit and scope of the invention.

What is claimed is:

1. A network device comprising:
    a teaching message generator to generate a teaching message including a host device address of a host device, wherein including the host device address in the teaching message allows the network device that is coupled between the host device and an additional network device to impersonate the host device, the teaching message to instruct the additional network device as to the host device address; and
    a transmitter to transmit the teaching message to the additional network device, the teaching message creating an appearance that the teaching message is received from the host device rather than from the network device.

2. The network device of claim 1, wherein the network device is a leaf switch, and the additional network device is a higher level switch.

3. The network device of claim 2, wherein the teaching message generator is to generate the teaching message for a subset of a set of host devices found in a forwarding table of the network device.

4. The network device of claim 1, wherein the teaching message includes a special type to identify the teaching message.

5. The network device of claim 1, wherein the transmitter is to transmit the teaching message by broadcasting or unicasting the teaching message.

6. The network device of claim 5, wherein the additional network device to which the teaching message is transmitted is not part of a spanning tree.

7. The network device of claim 1, wherein the teaching message is formatted using at least one of a specific Ethernet protocol type, or an Internet Control Message Protocol (ICMP).

8. The network device of claim 1, further comprising a counting module to determine that a period has expired in response to which the teaching message is transmitted.

9. The network device of claim 1, wherein the host device address is included as a source address in the teaching message.

10. The network device of claim 1, wherein the additional network device includes a switch, and the transmitting of the teaching message to the switch is to cause updating of a forwarding table at the switch, the forwarding table useable by the switch to determine paths over which messages are forwarded by the switch.

11. The network device of claim 1, further comprising at least one processor to identify a subset of switches less than an entirety of a set of switches, wherein the teaching message generator is to send teaching messages to just the subset of switches to cause learning of the host device at the set of switches.

12. A method comprising:
    traversing, by a network device, a forwarding table to identify a switch that has yet to receive a teaching message since an expiration of a predefined threshold value, the teaching message related to a source device; and
    transmitting, by a transmitter in the network device, the teaching message to the switch, the transmitting of the teaching message to the switch to cause updating of a forwarding table at the switch, the forwarding table useable by the switch to determine paths over which messages are forwarded by the switch.

13. The method of claim 12, wherein the predefined threshold value is a period of time.

14. The method of claim 12, wherein the transmitting comprises unicasting, by the transmitter, the teaching message on an uplink port used to connect a link to the switch.

15. The method of claim 12, wherein the transmitting comprises unicasting, by the transmitter, the teaching message on an uplink port that is indirectly connected through another network device to the switch.

16. The method of claim 12, wherein the switch is an upper level switch, and the network device is a leaf switch.

17. The method of claim 12, further comprising:
    receiving, by the switch from the network device, the teaching message;
    updating, by the switch, the forwarding table; and
    forwarding, by the switch, messages according to the updated forwarding table.

18. The method of claim 12, further comprising:
    inserting, by the network device, a device address of the source device into the teaching message as a source address in the teaching message, wherein including the device address as the source address in the teaching message allows the network device that is coupled between the source device and the switch to impersonate the source device, and wherein the teaching message creates an appearance that the teaching message is received from the source device rather than from the network device.

19. A leaf device comprising:
    a teaching engine implemented at least in hardware to teach an address of a host device, the teaching engine to teach via a unicast of a teaching message to a target device that is part of a set of devices that are connected to the leaf device via a path; and
    an identification engine implemented at least in hardware to identify a subset of the set of devices, connected to the leaf device via the path, that are taught as a result of the unicast of the teaching message to the target device.

20. The leaf device of claim 19, wherein the identification engine is to identify information related to connectivity of the set of devices that are connected to the leaf device via the path.

21. The leaf device of claim 19, further comprising:
    a teaching message generator to insert a device address of the host device into the teaching message as a source address in the teaching message, wherein including the device address as the source address in the teaching message allows the leaf device that is coupled between the host device and the target device to impersonate the host device, and wherein the teaching message creates an appearance that the teaching message is received from the host device rather than from the leaf device.

22. The leaf device of claim 19, wherein the identified subset of devices includes switches, and the teaching of the switches using the teaching message includes updating a forwarding table at each of the switches, the forwarding table useable by the respective switch to determine paths over which messages are forwarded by the respective switch.

* * * * *